(12) United States Patent
Hirabe

(10) Patent No.: US 10,033,096 B2
(45) Date of Patent: Jul. 24, 2018

(54) ANTENNA DEVICE AND CONTROL METHOD OF ANTENNA DEVICE

(71) Applicant: NEC Corporation, Tokyo (JP)

(72) Inventor: Masashi Hirabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/118,762

(22) PCT Filed: Jan. 26, 2015

(86) PCT No.: PCT/JP2015/000309
§ 371 (c)(1),
(2) Date: Aug. 12, 2016

(87) PCT Pub. No.: WO2015/129153
PCT Pub. Date: Sep. 3, 2015

(65) Prior Publication Data
US 2017/0062922 A1  Mar. 2, 2017

(30) Foreign Application Priority Data

Feb. 26, 2014 (JP) .................................. 2014-035472

(51) Int. Cl.
*H01Q 3/00* (2006.01)
*H01Q 3/08* (2006.01)
(Continued)

(52) U.S. Cl.
CPC ............. *H01Q 3/08* (2013.01); *H01Q 1/125* (2013.01); *H01Q 1/2291* (2013.01); *G06T 7/60* (2013.01); *G06T 7/73* (2017.01); *H04B 17/101* (2015.01)

(58) Field of Classification Search
None
See application file for complete search history.

(56) References Cited

U.S. PATENT DOCUMENTS 5,841,397 A * 11/1998 Hopkins ................. G01S 3/325
342/355
5,990,829 A * 11/1999 Garcia .................... G06K 9/209
342/359
(Continued)

FOREIGN PATENT DOCUMENTS

JP    2002-262166 A    9/2002
JP    2005-072780 A    3/2005
(Continued)

OTHER PUBLICATIONS

International Search Report corresponding to PCT/JP2015/000309, dated Mar. 10, 2015, p. 2.
(Continued)

*Primary Examiner* — Trinh Dinh
(74) *Attorney, Agent, or Firm* — Wilmer Cutler Pickering Hale and Dorr LLP

(57) ABSTRACT

The antenna device includes an antenna unit (110) mounted so that its direction is adjustable, a motor-driven unit (124, 125) that changes a direction of the antenna unit (110), a camera (130) fixed so that its direction relative to the antenna unit (110) does not change, and a direction adjustment control unit (200) that supplies a drive signal to the motor-driven unit (124, 125) and adjusts the direction of the antenna unit (110). The direction adjustment control unit (200) performs feedback control to return the direction of the antenna unit (110) back to an initial direction based on an image taken by the camera (130). It is thereby possible to maintain the communication quality even when a mechanical vibration occurs in a structure on which an antenna device is mounted.

4 Claims, 14 Drawing Sheets

(51) Int. Cl.
  *H01Q 1/12* (2006.01)
  *H01Q 1/22* (2006.01)
  *G06T 7/60* (2017.01)
  *H04B 17/10* (2015.01)
  *G06T 7/73* (2017.01)

(56) References Cited

U.S. PATENT DOCUMENTS

| | | | | |
|---|---|---|---|---|
| 2001/0035905 | A1* | 11/2001 | Auffret | G01S 3/783 |
| | | | | 348/159 |
| 2007/0293178 | A1* | 12/2007 | Milton | H01Q 1/2291 |
| | | | | 455/269 |
| 2011/0151932 | A1 | 6/2011 | Kim | |
| 2014/0205205 | A1 | 7/2014 | Neubauer | |
| 2015/0263408 | A1* | 9/2015 | Hirabe | H01Q 1/1228 |
| | | | | 343/894 |

FOREIGN PATENT DOCUMENTS

| | | | | |
|---|---|---|---|---|
| JP | 2007-033380 A | | 2/2007 | |
| JP | 2007-088576 A | | 4/2007 | |
| JP | 2011-151722 | * | 8/2011 | H04N 5/222 |
| JP | 2011-151722 A | | 8/2011 | |
| JP | 2013-120086 A | | 6/2013 | |
| WO | WO-2013/003872 A1 | | 1/2013 | |

OTHER PUBLICATIONS

Extended European Search Report issued by the European Patent Office for the European Application No. 15755536.8 dated Jun. 29, 2017 (8 pages).

* cited by examiner

ANTENNA DEVICE AND CONTROL METHOD OF ANTENNA DEVICE

CROSS-REFERENCE TO RELATED APPLICATIONS

This application is a national stage application of International Application No. PCT/JP2015/000309 entitled "ANTENNA DEVICE AND CONTROL METHOD OF ANTENNA DEVICE," filed on Jan. 26, 2015, which claims the benefit of the priority of Japanese Patent Application No. 2014-035472 filed on Feb. 26, 2014, the disclosures of each of which are hereby incorporated by reference in their entirety.

TECHNICAL FIELD

The present invention relates to an antenna device and a control method of an antenna device that automatically adjust the direction of an antenna.

BACKGROUND ART

When installing a directional antenna, it is important to orient it toward an appropriate direction in order to maximize the reception level. Since radio waves at millimeter-wave frequencies have been used recently, it is required to set the antenna orientation with respect to the wave source antenna with a level of accuracy equivalent to the accuracy needed to thread the eye of a needle. For example, extremely fine angle adjustment of 1.0° or less, such as 0.4° or 0.2°, is required today. Various methods for setting the antenna orientation (i.e., orientating the antenna) toward the wave source direction have been proposed (for example, Patent Literature 1, 2 and 3).

CITATION LIST

Patent Literature

PTL1: Japanese Unexamined Patent Application Publication No. 2007-33380
PTL2: Japanese Unexamined Patent Application Publication No. 2007-88576
PTL3: Japanese Unexamined Patent Application Publication No. 2005-72780

SUMMARY OF INVENTION

Technical Problem

In recent years, small cells with a coverage of about several tens to several hundreds meters have been used for the purpose of increasing the communication capacity, enhancing the communication speed and improving the coverage hole mainly in city areas. Small cells are also called picocells and femtocells. When installing a large number of antenna devices in a city area, it is necessary to install an antenna device in a position near the ground or on a non-robust structure in many cases, and, for example, there is a case where an antenna device is installed on a lamp post.

However, a lamp post or the like is subject to deformation and mechanical vibration due to external forces such as wind, vibration from a subway and an earthquake. For example, in FIG. 14, the antenna 10 is mounted on a structure (for example, a lamp post). When a structure 40 vibrates, the antenna 10 vibrates accordingly. Because the antenna 10 transmits and receives a directional beam 51, if the orientation of the antenna 10 (e.g. the directional beam 51) changes due to a mechanism vibration, the communication quality of a radio link is significantly degraded.

Further, when the antenna 10 is mounted on a lamp post 50, even if the vibration of the lamp post 50 is very small, the vibration of the antenna 10 that is mounted at the upper part of the lamp post 50 is not necessarily small. Further, in the case where the frequency of a mechanical vibration happens to be synchronous with the natural frequency of the lamp post, there is a concern that the vibration of the antenna 10 can be significantly large.

Additionally, the fact that not only the antenna itself but also a station opposite to the antenna (hereafter, 'an opposite station') is subject to vibration makes the problem more complicated.

If an opposite station is stable and thus not moved, a decrease in reception strength is attributed only to vibration of the antenna itself. In this case, it is only necessary to search for a direction in which the reception strength is maximized and adjust the direction so that it is oriented to that direction. (Such an operation may be achieved by feedback control on the basis of the reception strength.)

However, if an opposite station vibrates also, a decrease in reception strength is not attributed only to vibration of the antenna itself. It is impossible to search for a direction in which the reception strength is maximized in the circumstances where both the antenna itself and the opposite station are vibrating, and their control operations collapse (diverge) in the worst case.

An exemplary object of the present invention is to provide an antenna device and a control method of an antenna device that can maintain the communication quality even when a mechanical vibration occurs in a structure on which an antenna device is mounted.

Solution to Problem

An antenna device according to an exemplary aspect of the present invention includes an antenna unit, a camera unit fixed so that its direction relative to the antenna unit does not change, and a direction adjustment control unit that adjusts a direction of the antenna unit, wherein the direction adjustment control unit controls to return the direction of the antenna unit back to an initial direction based on an image taken by the camera unit.

A control method of an antenna device according to an exemplary aspect of the present invention is a control method of an antenna device including an antenna unit mounted so that its direction is adjustable, a motor-driven unit that changes a direction of the antenna unit, a camera unit fixed so that its direction relative to the antenna unit does not change, and a direction adjustment control unit that supplies a drive signal to the motor-driven unit and adjusts the direction of the antenna unit, the method including controlling to return the direction of the antenna unit back to an initial direction based on an image taken by the camera unit.

Advantageous Effects of Invention

According to the exemplary aspects of the present invention, it is possible to maintain the communication quality even when a mechanical vibration occurs in a structure on which an antenna device is mounted.

DESCRIPTION OF EMBODIMENTS

Figure 1:
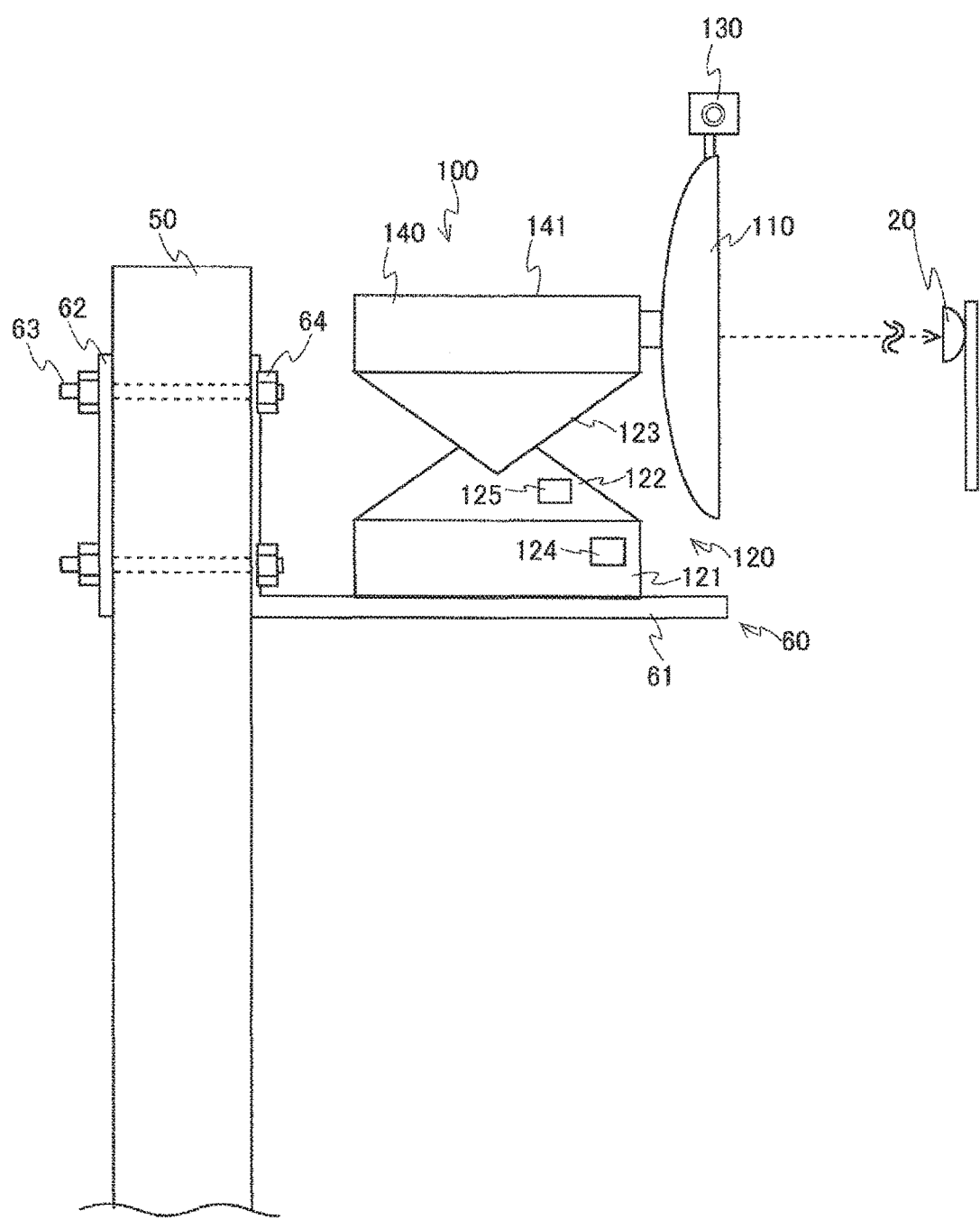
FIG. 1 is a view showing the state where an antenna device according to a first exemplary embodiment is set up.

Exemplary embodiments of the present invention are illustrated in the drawings and described hereinafter by referring to the reference symbols of elements in the drawings.

First Exemplary Embodiment

A first exemplary embodiment of the invention is described hereinafter.

FIG. 1 is a view showing the state where an antenna device according to a first exemplary embodiment is set up.

An antenna device 100 is mounted, for example, on a lamp post 50 (fixed structure). When mounting the antenna device 100 on the lamp post 50, an installation base 60 is first attached to the lamp post 50. The installation base 60 includes an L-shaped member 61 and a bracket 62. The lamp post 50 is placed between the L-shaped member 61 and the bracket 62, and the L-shaped member 61 and the bracket 62 are fastened by a bolt 63 and a nut 64. The L-shaped member 61 serves as an installation plane.

The antenna device 100 is fixed on the installation plane (L-shaped member 61). The antenna device 100 includes an antenna unit 110, a pan head 120, a camera 130, and a control unit 140.

The antenna unit 110 is a parabolic antenna in this example. The antenna unit is an antenna having directionality, and it is not limited to being a parabolic antenna, and it may be instead a planar antenna, The pan head 120 includes a base table 121, a rotating table 122 that can rotate at 360° in the horizontal direction (azimuth direction) with respect to the base table 121, and a turning table 123 that can turn in the vertical direction (elevation and depression directions) with respect to the rotating table 122.

The control unit 140 and the antenna unit 110 are held by the turning table 123 and their positions change in accordance with a change in the position of the turning table 123.

Further, the pan head 120 includes a rotating motor 124 that drives the rotating table 122 to rotate it and a turning motor 125 that drives the turning table 123 to turn.

The camera 130 may be a so-called digital camera, for example, which includes a lens and an image sensor (CCD or CMOS) and has a function of taking images. A direction which the camera 130 takes images of is arbitrary. Note that, however, as will be apparent from the following description, an object whose position is set (fixed) needs be within an imaging region. In other words, an imaging direction to merely take a sky image, for example, is of no use. It is preferred that a construct such as a building or a house, for example, appears in the image. Further, if possible, it is more preferred that an object with a clear color, shape or the like appears in the image. A worker who installs the antenna device 100 looks over the surroundings and roughly determines the orientation of the camera 130 so that the above-described construct appears in the image. Then, the worker fixedly mounts the camera 130 on an appropriate place on the antenna device 100. For easier understanding, FIG. 1 shows the case where the transmitting and receiving direction of the antenna unit 110 and the imaging direction of the camera are shifted by about 90°. Specifically, the transmitting and receiving direction of the antenna unit 110 is rightward, and the imaging direction of the camera is frontward.

Although the camera 130 is mounted on the antenna unit 110 in FIG. 1, it may be fixed to the housing 141 of the control unit 140. The camera 130 may be fixed to any place on the antenna device 100. Although the camera 130 may be mounted on the antenna device 100 by any means, even when the easiest way of mounting the camera 130 is employed, it is necessary that the positions and orientations of the antenna unit 110 and the camera 130 are not displaced relative to each other. Stated differently, if the position or orientation of the antenna unit 110 changes, the position or orientation of the camera 130 should change in the same way.

The camera 130 and the antenna device 100 are not necessarily separated from each other, and the camera 130 may be embedded in the antenna device 100. In other words, the camera 130 may be built in the antenna device 100.

The control unit 140 includes a housing 141 and an internal circuit.

Figure 2:
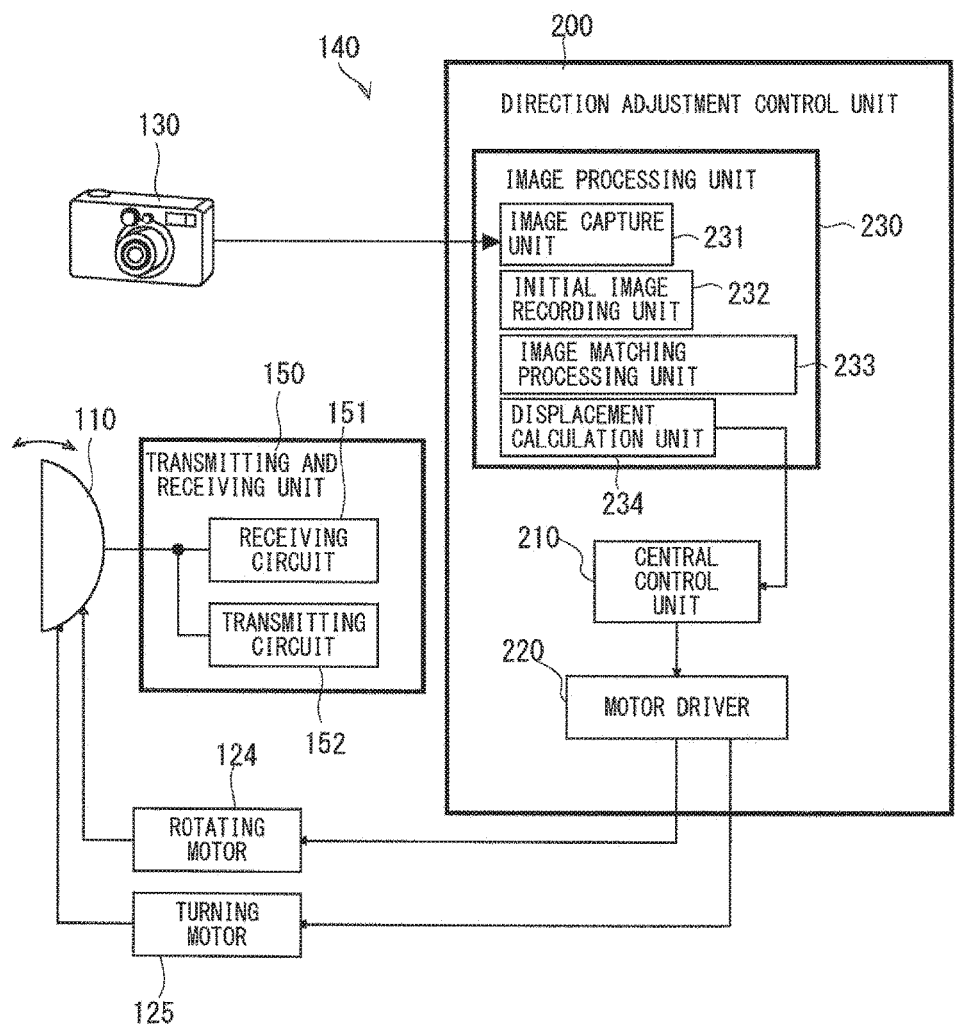
FIG. 2 is a functional block diagram of a control unit.

FIG. 2 is a functional block diagram of the internal circuit. In FIG. 2, the functions of the control unit 140, except for a motor driver 220, may be implemented as a result of a CPU loading a program.

The control unit 140 includes a transmitting and receiving unit 150 and a direction adjustment control unit 200.

The transmitting and receiving unit 150 is an electrical circuit unit that includes a receiving circuit 151 and a transmitting circuit 152 and performs modulation and demodulation of signals according to the need.

The direction adjustment control unit 200 includes a central control unit 210, a motor driver 220, and an image processing unit 230.

The image processing unit 230 includes an image capture unit 231, an initial image recording unit 232, an image matching processing unit 233, and a displacement calculation unit (position calculation unit) 234.

The detailed operation of each functional unit is described later with reference to the flowchart and the illustration.
(Description of Operation)

A series of operations for automatically adjusting the orientation of the antenna unit 110 in the most appropriate direction is described hereinafter.

To implement the automatic orientation adjustment, the antenna device 100 needs to be set up appropriately as shown in FIG. 1. Specifically, it is a prerequisite that the antenna unit 110 is oriented in the direction of an opposite station and it favorably transmits radio waves to the opposite station and receives them therefrom when there is no vibration or the like. To orient the direction of the antenna unit 110 toward the opposite station 20, an existing method may be used, or a direction in which the reception strength level reaches its peak may be searched for by trial and error.

It is assumed that the antenna device 100 is set up appropriately.

The direction (azimuth, elevation) in which the antenna unit 110 is oriented at this time is referred to as the "initial direction" of the antenna unit 110 or the "initial position" of the antenna unit 110.

If it is possible to control the antenna unit 110 to always turn back to the initial direction (initial position), it would be possible to maintain the high communication quality of a radio link.

The problem is how to return the antenna unit 110 back to the initial direction (initial position).

Figure 3:
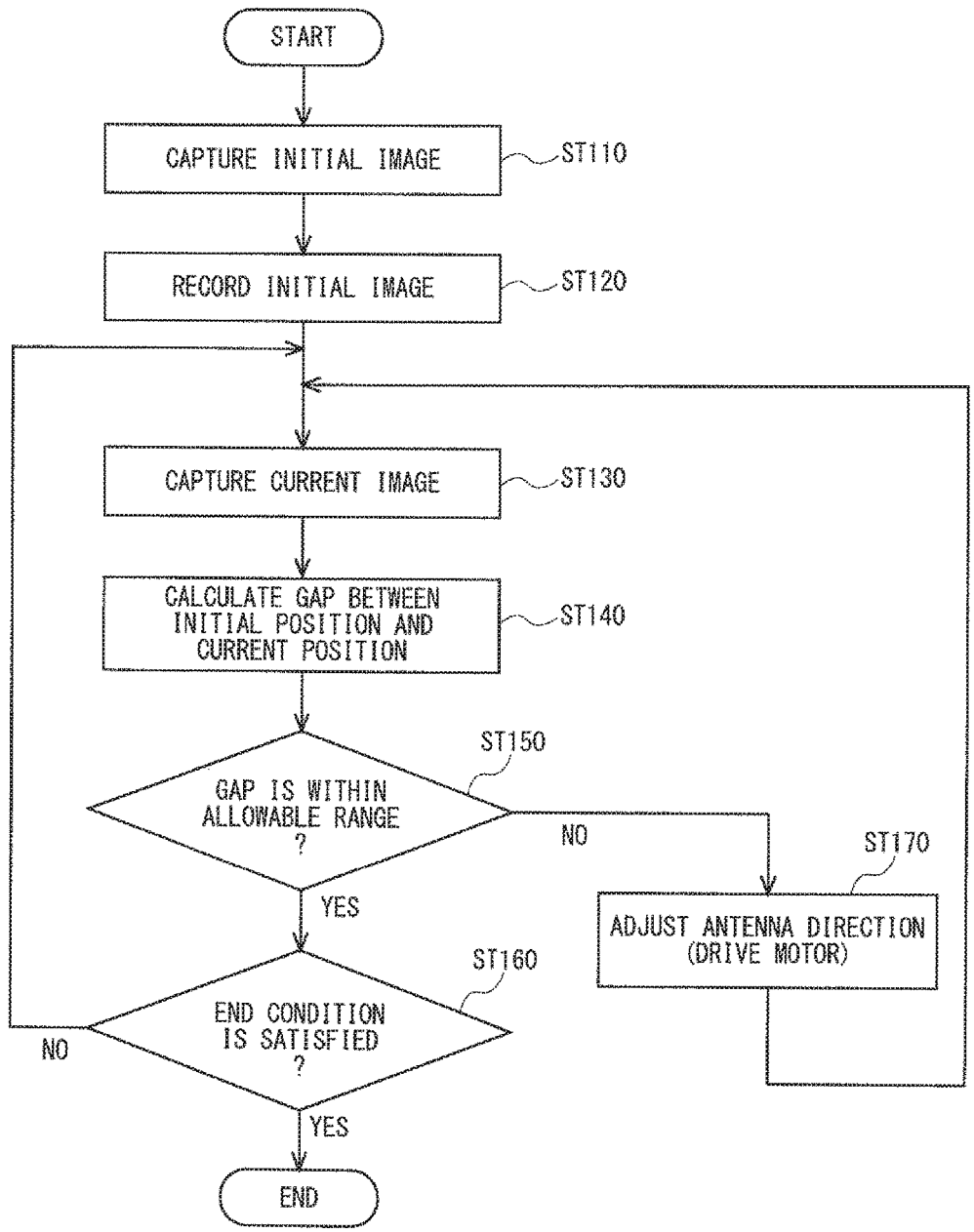
FIG. 3 is a flowchart showing an operation procedure of automatically adjusting the orientation of an antenna unit in the most appropriate direction.

FIG. 3 is a flowchart showing an operation procedure of automatically adjusting the orientation of the antenna unit 110 in the most appropriate direction.

The first to be performed is the capture of an initial image (ST110). The camera 130 is already mounted on the antenna device 100, and the image capture unit 231 captures the current image in the camera 130 as an initial image (ST110).

Figure 4:
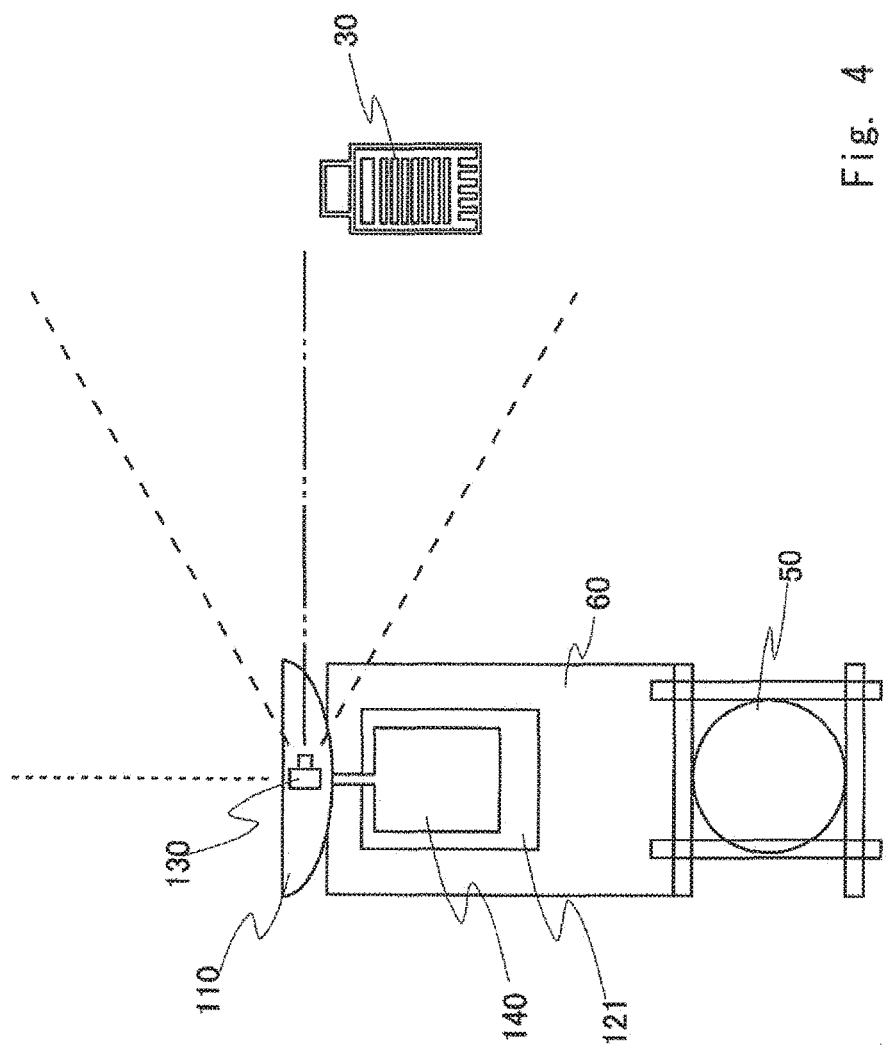
FIG. 4 is a view showing the antenna device viewed from above.
Figure 5:
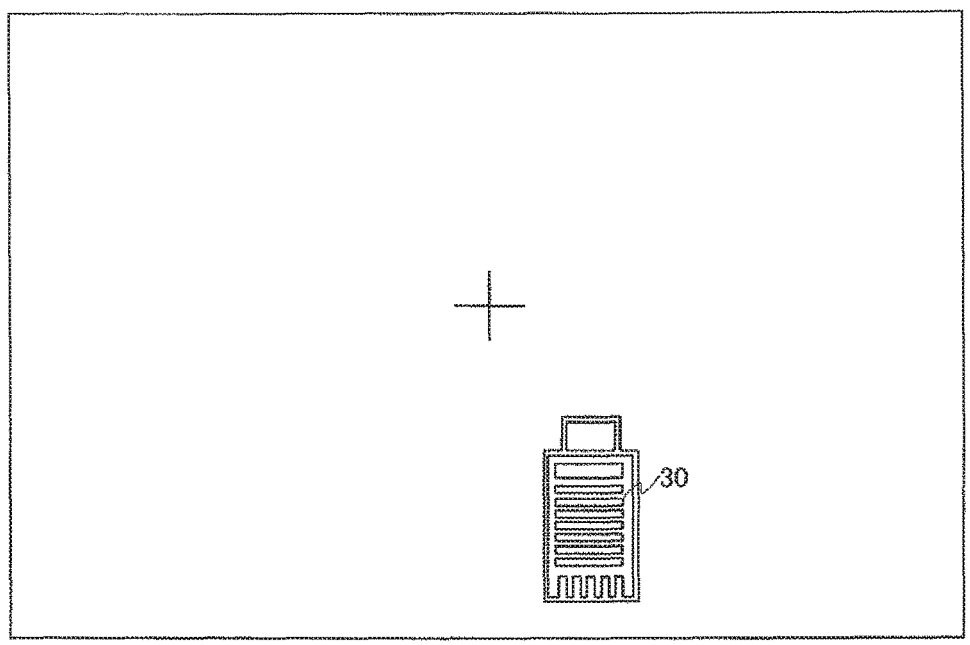
FIG. 5 is a view showing an example of a camera image at an initial position.

FIG. 4 is a view showing the antenna device 100 viewed from above. In FIG. 4, the imaging range of the camera 130 is indicated by the dotted line. (Note that the alternate long and short dashed line indicates the center line of the imaging range.) In the example of FIG. 4, it is assumed that a building 30 stands near the center of the imaging range of the camera 130. Accordingly, the building 30 appears on the right of the center of the camera image as shown in FIG. 5. The initial image is recorded in the initial image recording unit 232.

After capturing the initial image (ST110), the central control unit 210 performs position feedback control based on the camera image at a specified control cycle in ST130 to ST170.

Figure 6A:
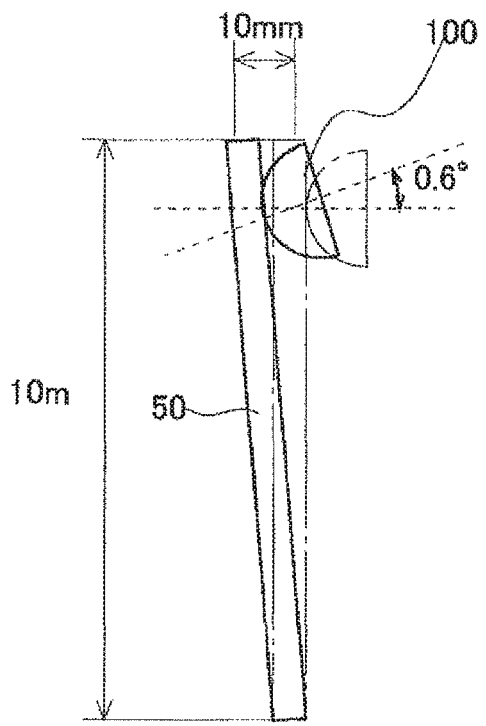
FIG. 6A is a view showing the state where a lamp post is bent due to vibration.
Figure 6B:
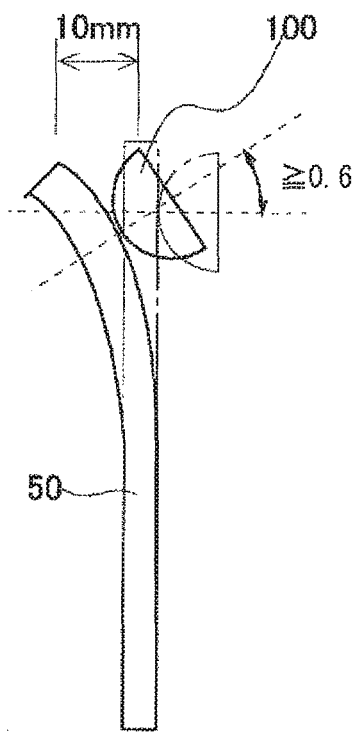
FIG. 6B is a view showing the state where a lamp post is bent due to vibration.

To better understand the effects of this exemplary embodiment, assume the case where a relatively large vibration is applied to the lamp post 50. When the relatively large vibration is applied to the lamp post 50, the lamp post 50 is bent or skewed. For example, it is assumed that a pole with a height of 10 m is bent and the upper end is displaced by about 10 mm as shown in FIG. 6A. In this case, the transmitting and receiving direction of the antenna unit is shifted by about 0.6° in the EL direction (elevation angle, elevation and depression directions) even based on simple linearization (FIG. 6A). In practice, the displacement of the direction of the antenna unit is larger because the pole is bent at a multi-order curve (FIG. 6B).

Figure 7:
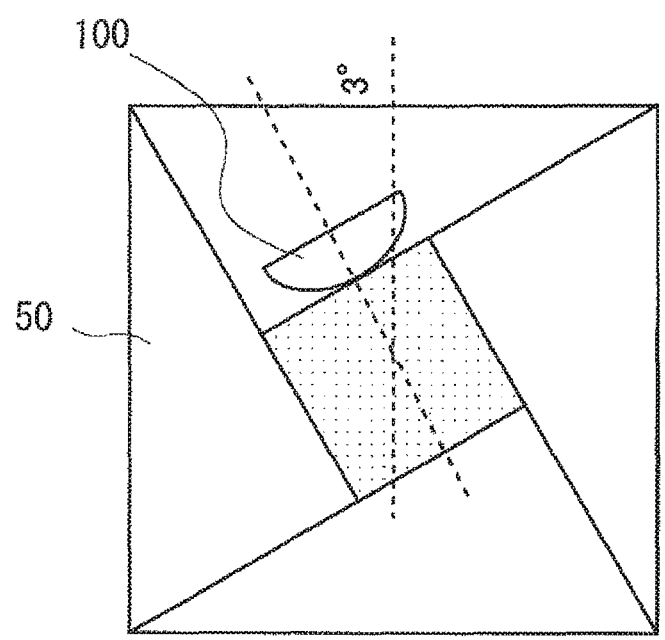
FIG. 7 is a view showing the state where a lamp post is skewed due to vibration.

Further, as shown in FIG. 7, the pole is also skewed. In FIG. 7, the section of the pole is a square, not a circle, for easier understanding the skew. According to some experimental data, the upper end of the pole is skewed by about 3°, and in this case, the transmitting and receiving direction of the antenna unit is displaced by about 3° to the AZ direction (azimuth angle).

The communication quality is degraded if the pole is bent or skewed and the transmitting and receiving direction of the antenna unit 110 is displaced by about 0.6° or more, and it is thus necessary to take some measures.

Note that, some may think that translational motion (parallel translation) would occur in the antenna device when a relatively large vibration is applied to the lamp post 50, and this is described in addition.

Figure 8:
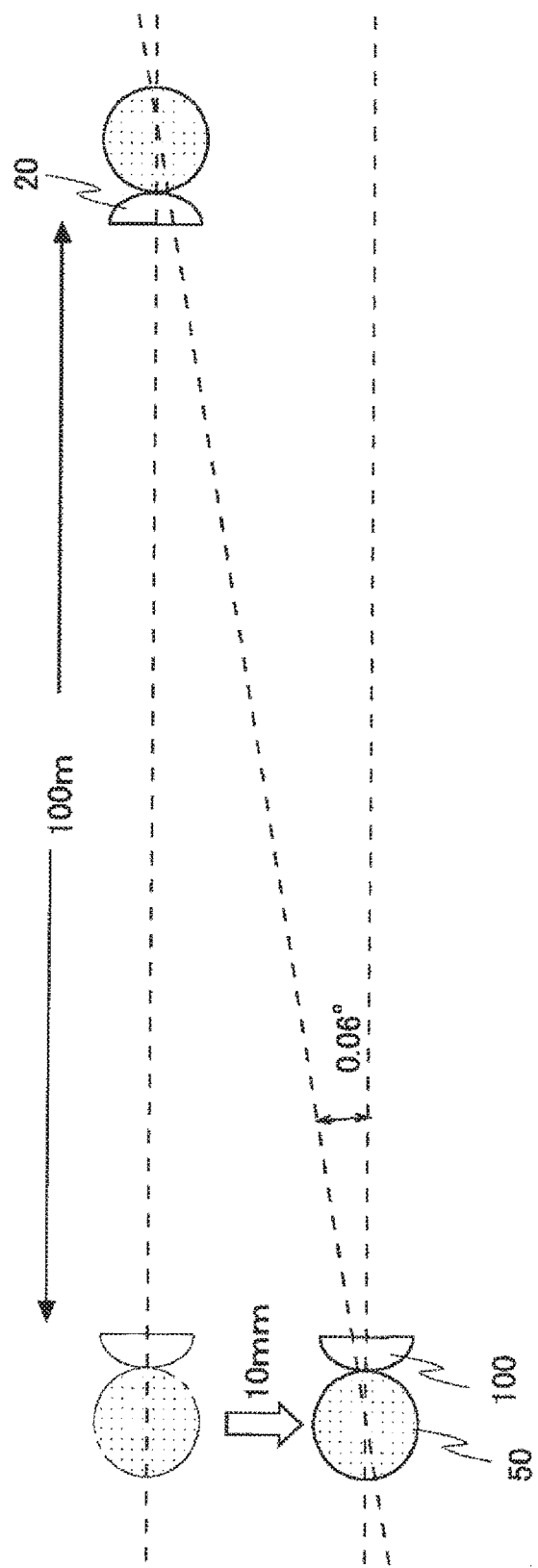
FIG. 8 is a view showing the state where the antenna device is displaced in parallel due to vibration for reference.

For example, it is assumed that the antenna device moves in parallel by 10 mm in a lateral direction when it is at a distance of 100 m from the opposite station 20 as shown in FIG. 8. The displacement of the direction in this case is about 0.06°, and therefore its effect on the communication quality is smaller than the displacement of the direction due to bending or skewing described above.

Figure 9:
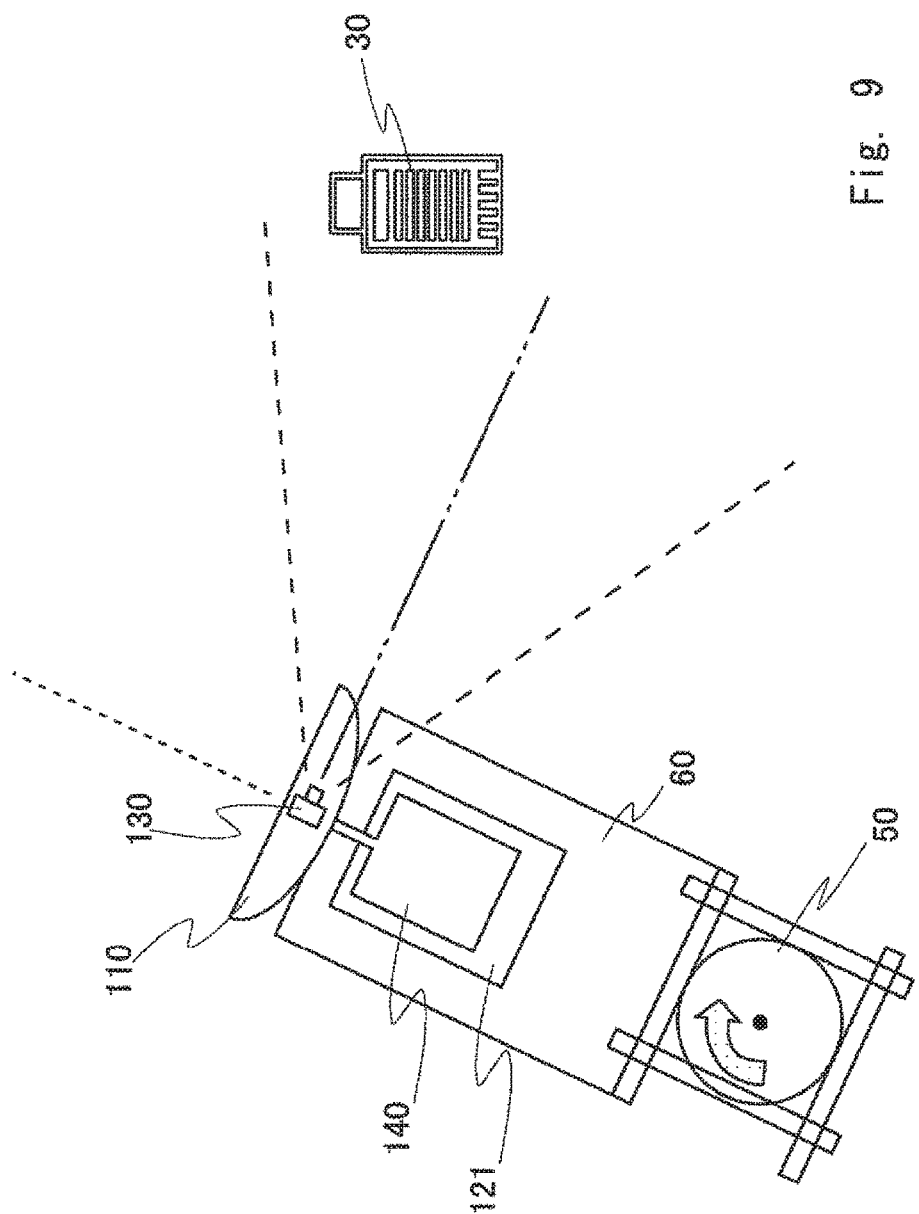
FIG. 9 is a view showing the state where a lamp post is bent due to vibration.
Figure 10:
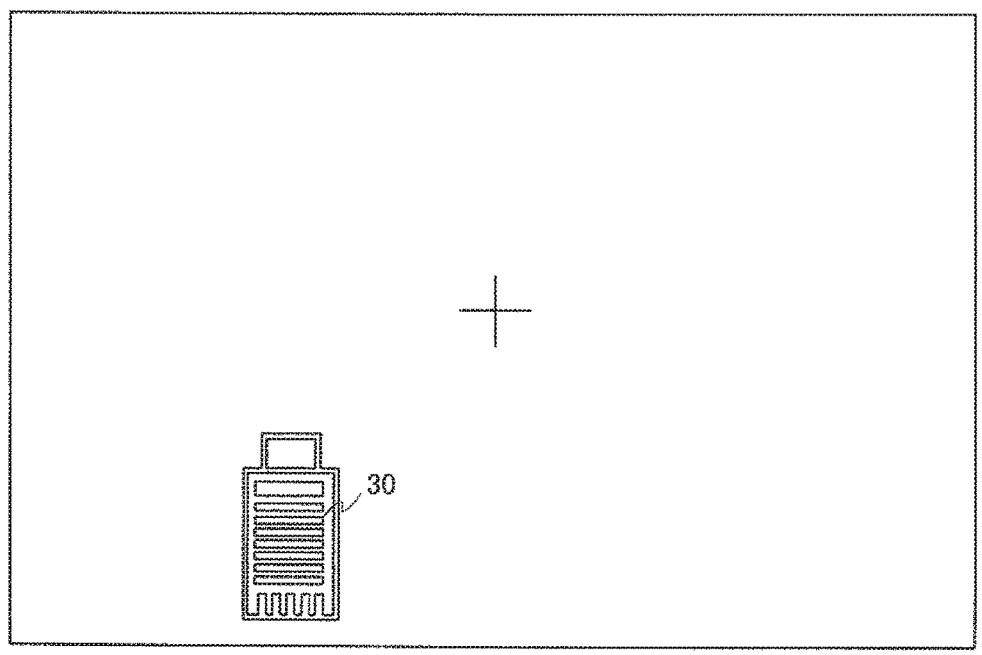
FIG. 10 is a view showing an example of a camera image.

Further, it is assumed that if a relatively large vibration is applied to the lamp post 50, the lamp post 50 is skewed as shown in FIG. 9, and thereby the orientation of the antenna device 100 is changed. (Note that, although the position of the antenna device 100 is largely displaced in FIG. 9 for the convenience of description, it is an exaggeration). The camera 130 is displaced together with the antenna device 100. Accordingly, an image taken by the camera 130 changes. As a result, the building 30 is displaced leftward in the imaging region as shown in FIG. 10.

The image capture unit 231 captures the current image taken by the camera 130 (ST130). Then, the image processing unit 230 compares the current image with the initial image and thereby calculates a gap between the current image and the initial image (ST140). Comparing two images and recognizing the images to see how much one is deviated from the other is an application of pattern matching and implemented by various methods. For example, Phase-Only Correlation is known.

Figure 11:
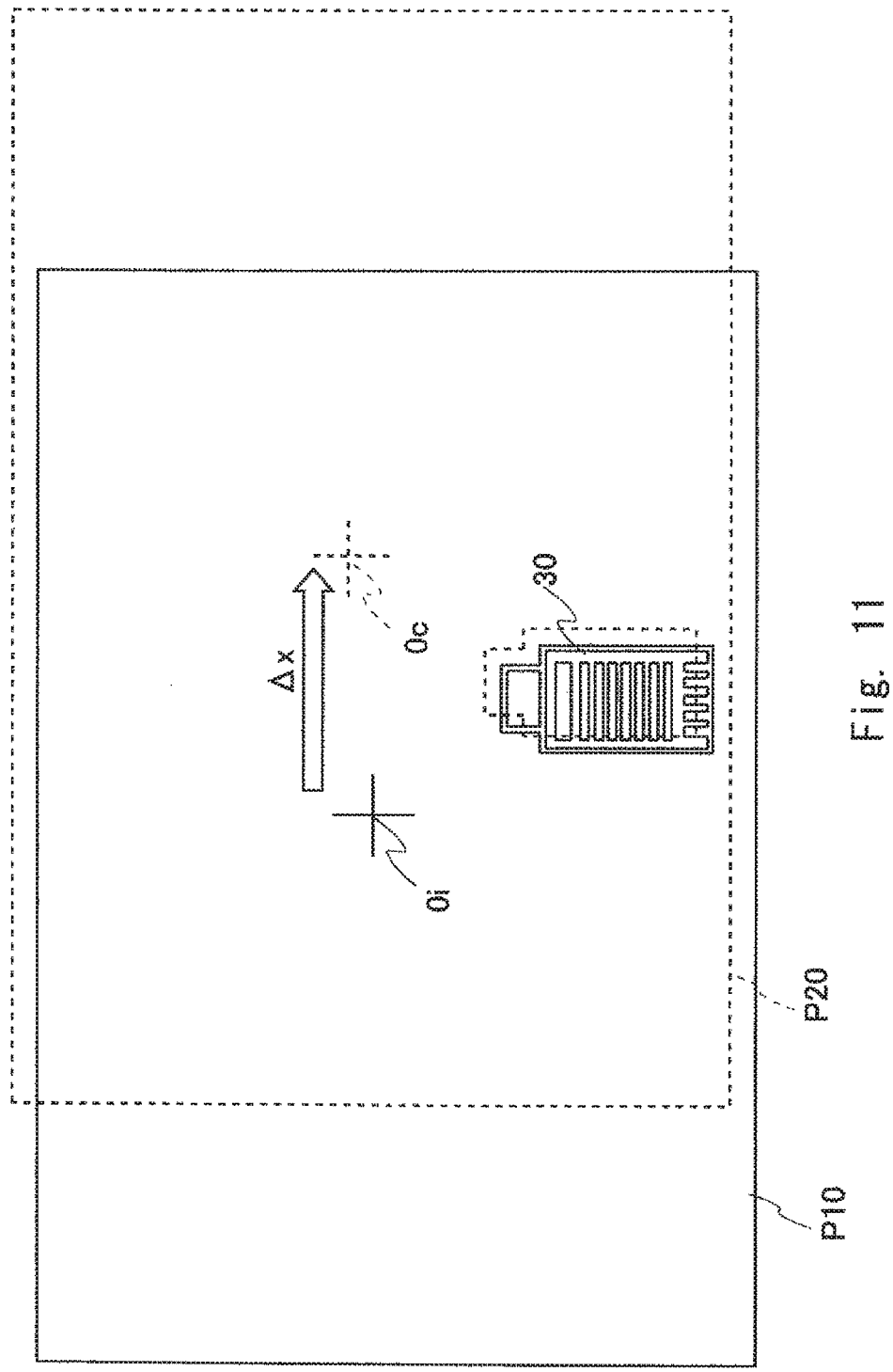
FIG. 11 is a view illustrating a process of matching images.

The image matching processing unit 233 compares the initial image P10 with the current image P20 and shifts the current image P20 so that the current image P20 most closely matches the initial image P10. FIG. 11 is a view showing the state where the current image P20 is superimposed on the initial image P10 so that they match. It is assumed that the building 20, which has appeared in the right of the center in the initial image P10, appears to the left in the current image P20. In this case, it is found that the image center Oc of the current image P20 is displaced to the right relative to the image center Oi of the initial image P10.

Figure 12:
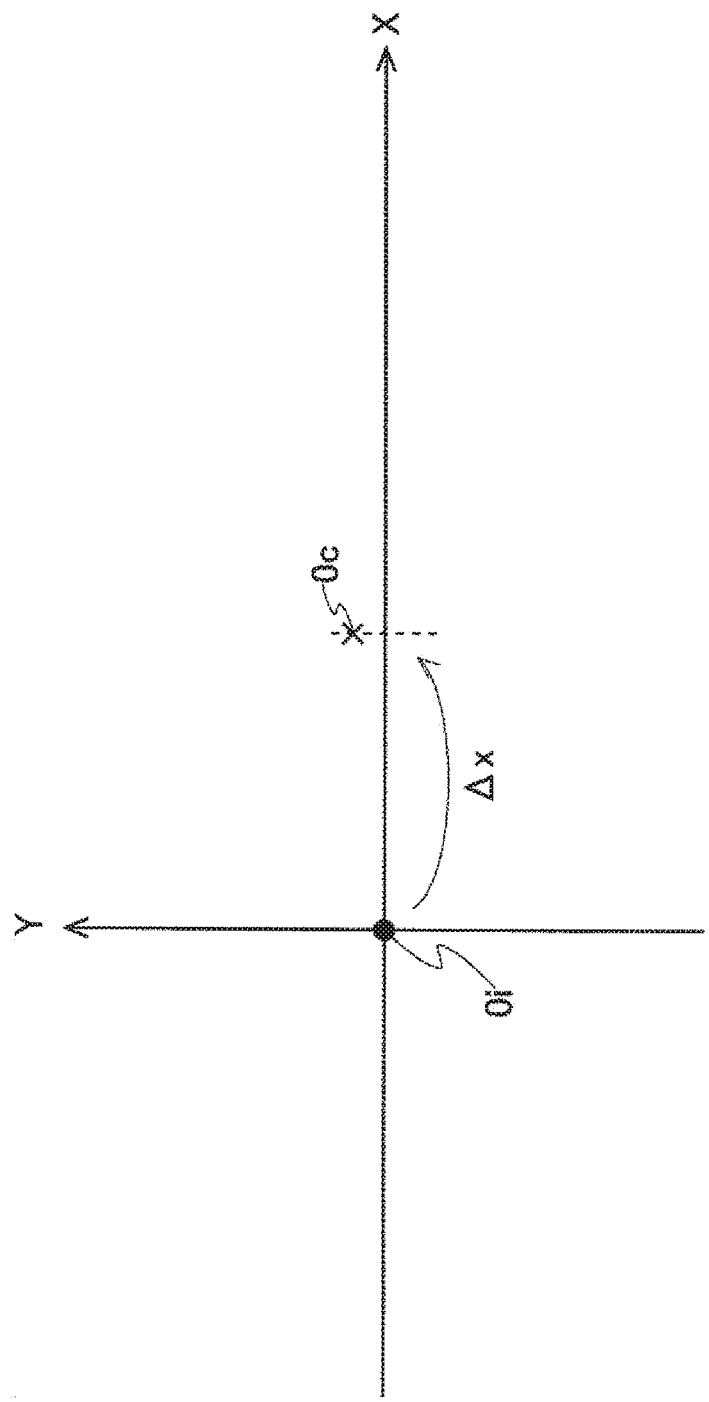
FIG. 12 is a view illustrating a gap.

The displacement calculation unit 234 calculates the gap between the current image P20 and the initial image P10 based on a result of matching by the image matching processing unit 233 (ST140). In this example, it is calculated how many pixels are left as a gap. As shown in FIG. 12, it is assumed that the crosswise direction is the x-axis direction and the lengthwise direction is the y-axis direction in the display image. The displacement calculation unit 234 calculates the gap by calculating how many ($\Delta X$) pixels in the x-direction and how many ($\Delta Y$) pixels in the y-direction the current image P20 is deviated from the initial image P10.

After the position of the current image P20 is obtained (ST140), it is determined whether the gap is within the allowable range. This processing is performed by the central control unit 210. It is assumed that the allowable range is preset to the central control unit 210. For example, it is assumed that εx and εy are set as the allowable range of the gap.

The central control unit 210 compares the gap ($\Delta X$, $\Delta Y$) with the allowable range (εx, εy). When the gap ($\Delta X$, $\Delta Y$) is within the allowable range (εx, εy), the control loop is returned to ST130. Note that, $\Delta X \leq \varepsilon x$ and $\Delta Y \leq \varepsilon y$ are satisfied when the gap ($\Delta X$, $\Delta Y$) is within the allowable range (εx, εy).

On the other hand, when the gap ($\Delta X$, $\Delta Y$) is outside the allowable range (εx, εy), the orientation adjustment of the antenna unit is performed (ST170). Note that ΔX>εx and/or ΔY>εy are satisfied when the gap (ΔX, ΔY) is outside the allowable range (εx, εy).

A direction in which the current position is displaced with respect to the initial position is known by the calculation of the gap. Thus, the rotating table 122 and the turning table 123 are turned to cancel the gap (ΔX, ΔY). Specifically, drive signals are sent from the motor driver 220 to the rotating motor 124 and the turning motor 125.

Note that, although it is known how many pixels the current position is deviated in the image taken, the actual "amount" is not known. In other words, even if the gap (ΔX, ΔY) in the image is known, it is not possible to obtain a specific number of degrees of the angle the antenna unit 110 should be turned in the azimuth or elevation (depression) direction. (To accurately obtain this value, it would be necessary that a precise distance between the antenna device 100 and the opposite station 20 is given.)

Figure 13:
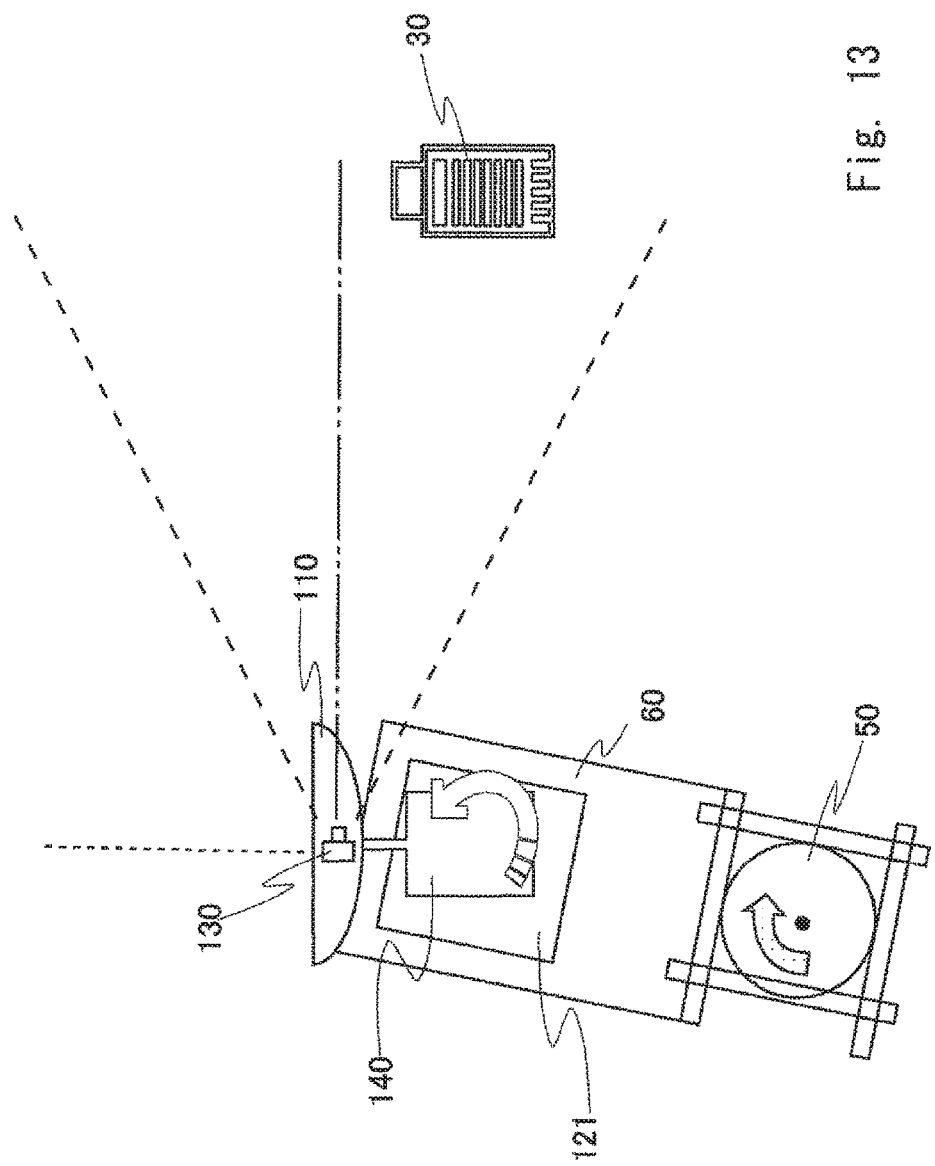
FIG. 13 is a view illustrating a change of the orientation of the antenna unit so as to cancel vibration.
Figure 14:
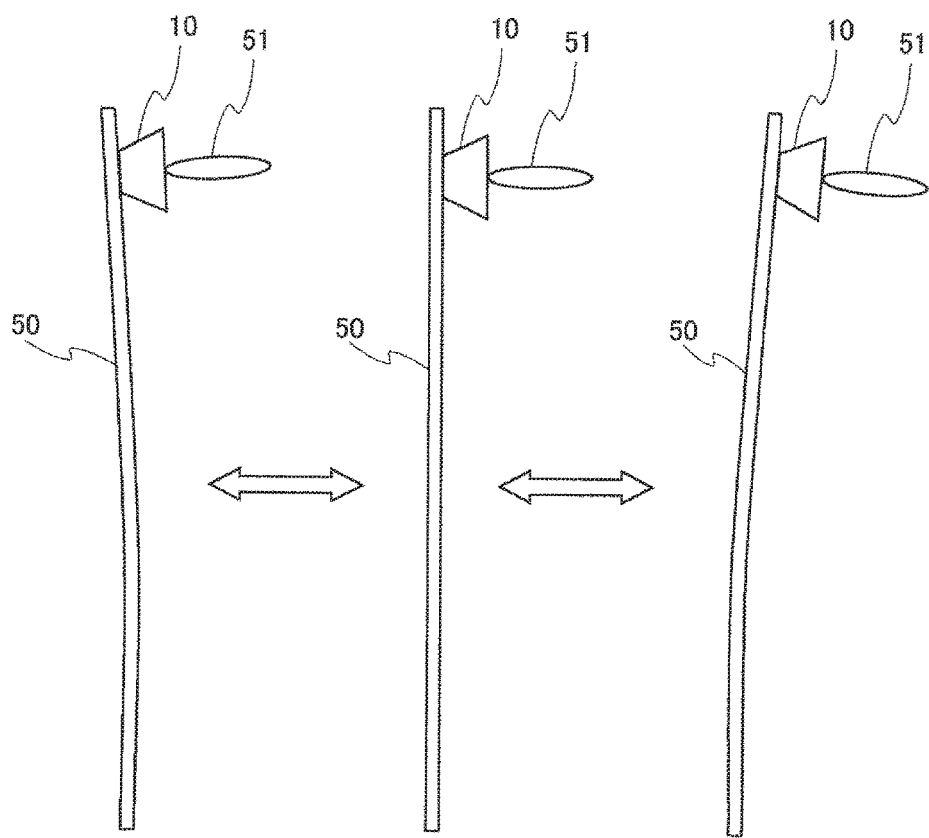
FIG. 14 is a view illustrating background art.

Thus, when driving the motors 124 and 125, a predetermined amount (number) of pulse signals are applied to the motors 124 and 125 for micro driving of the motors 124 and 125. After that, the control operation is returned to ST130 and it is determined whether there is a remaining gap (ST150), and micro driving of the motors 124 and 125 is repeated until the gap falls within the allowable range. Then, the antenna unit 110 turns in the direction of the opposite station 20 as shown in FIG. 13.

In this manner, by performing position feedback control on the basis of a camera image in ST130 to ST170, it is possible to always set the direction of the antenna unit 110 toward the opposite station 20 even when a vibration is applied to the lamp post 50.

According to the first exemplary embodiment with the above-described structure, the following advantageous effects can be obtained.

(1) According to this exemplary embodiment, it is possible to automatically adjust the direction of the antenna unit 110 so that it is oriented toward the opposite station 20. In this exemplary embodiment, position feedback based on a camera image, not feedback control based on the reception strength level, is performed. If feedback control is performed based on the reception strength level, control collapses when a mechanical vibration occurs in the opposite station 20, for example. On the other hand, when position feedback based on a camera image is performed like in this exemplary embodiment, the antenna unit 110 can be oriented in the direction of the opposite station 20 regardless of the state of the opposite station 20 (regardless of the reception strength level). This is significantly effective in the circumstances where a mechanical vibration occurs in both the antenna itself and the opposite station 20 like in city areas.

(2) The displacement of the antenna device 100 due to a mechanical vibration and the swinging of the antenna unit 110 by rotation and turn driving can be detected by a camera image. Thus, in this exemplary embodiment, there is no need for an expensive sensor (for example, a highly accurate rotary encoder, angular velocity sensor etc.) or the like for detecting the azimuth and the elevation of the antenna unit 110 with high accuracy (for example, at 0.1° or less). This contributes to size and cost reduction.

Differences between the exemplary embodiment and the related art are described for reference.

Although, in this exemplary embodiment, a camera is used as a sighting device or the like, this exemplary embodiment is different from Japanese Unexamined Patent Application Publications Nos. 2007-33380, 2007-88576 and 2005-72780 in which a camera is used as a sighting device in the antenna installation stage (Japanese Unexamined Patent Application Publications Nos. 2007-33380, 2007-88576 and 2005-72780 are collectively referred to as related art literature). In the related art literature, the optical axis of the camera and the transmitting and receiving direction of the antenna unit are aligned in advance. Then, the orientation of the antenna is adjusted so that an opposite station appears at the center of the camera image. The antenna unit is thereby oriented to the opposite station accurately, which achieves the maximum reception strength according to the related art literature.

On the other hand, in this exemplary embodiment, the orientation of the antenna unit is previously set in a direction in which the maximum reception strength is achieved by some means. The camera is installed after that. Then, feedback control is performed so that a certain landmark (the building 30 in the above-described example) does not move in the imaging area even when a mechanical vibration occurs, and thereby the antenna unit is always oriented to the opposite station.

There is a case where the radio wave emitting direction (radio wave receiving direction) of the antenna unit is deviated from a designed direction or the optical axis of the camera is deviated from a designed direction. In such a case, it is apparent that the techniques of the related art literature do not work well in the antenna installation stage. On the other hand, in this exemplary embodiment, it is not at all necessary for the optical axis of the camera and the transmitting and receiving direction of the antenna unit to be aligned, and it is only necessary to register the camera image when the reception strength level is maximum as the initial image. As a matter of course, the related art literature discloses nothing about position feedback control on the basis of the camera image after the antenna installation.

It should be noted that the present invention is not limited to the above-described exemplary embodiment and may be varied in many ways within the scope of the present invention.

The functional units of the direction adjustment control unit 200 may be dedicated hardware composed of various logical elements. Alternatively, the functions of the central control unit 210 and the image processing unit 230 may be implemented by incorporating a given program into a computer having a CPU (Central Processing Device), a memory (storage device) and the like. The above-described functional units may be implemented by installing an antenna orientation adjustment program to the memory in the computer having the CPU and the memory through a communication means such as the Internet or a nonvolatile recording medium such as a CD-ROM or a memory card and causing the CPU or the like to operate with the installed program. The program may be installed by directly inserting the memory card, the CD-ROM or the like into the computer or externally connecting equipment that reads such as a storage medium to the computer. Further, the program may be supplied and installed through communication by connecting a LAN cable, a wired or wireless communication line to the computer.

In some structure of the antenna device, the azimuth and the elevation can be made variable by one orientation adjustment part. Such an antenna device is disclosed in Japanese Unexamined Patent Application Publication No. H5-67909, for example. In this case, only one motor is used.

The reception strength level may be measured, and, for example, when the average reception strength per unit time falls below a specified threshold, the automatic orientation adjustment in the above-described exemplary embodiment may be carried out.

A function of updating the initial direction at regular or irregular intervals may be added. Specifically, the angle position of the antenna unit 110 at which the reception strength is maximized may be automatically obtained and set as a new initial direction.

For example, the direction of the antenna unit is varied in a specified range by the driving of a motor-driven (i.e., electrically-driven) unit (the rotating motor 124 and the turning motor 125). At this time, an image taken by the camera 130 and the reception strength of radio waves received by the antenna unit 110 are recorded. Then, the angle position of the antenna unit 110 in which the reception strength is maximized is obtained.

Note that, although it is most preferable to find "the direction in which the reception strength is maximized", a certain deviation is allowed for the initial direction as long as it is within a range where the reception strength level, BER (bit error rate) or SNR (signal to noise ratio) satisfies a specified level (good radio wave communication is achieved).

This application is based upon and claims the benefit of priority from Japanese patent application No. 2014-35472, filed on Feb. 26, 2014, the disclosure of which is incorporated herein in its entirety by reference.

REFERENCE SIGNS LIST

10 ANTENNA
20 OPPOSITE STATION
40 STRUCTURE
50 LAMP POST
51 DIRECTIONAL BEAM
60 INSTALLATION BASE
61 L-SHAPED MEMBER
62 BRACKET
63 BOLT
64 NUT
100 ANTENNA DEVICE
110 ANTENNA UNIT
120 PAN HEAD
121 BASE TABLE
122 ROTATING TABLE
123 TURNING TABLE
124 ROTATING MOTOR
125 TURNING MOTOR
130 CAMERA
140 CONTROL UNIT
141 HOUSING
150 TRANSMITTING AND RECEIVING UNIT
151 RECEIVING CIRCUIT
152 TRANSMITTING CIRCUIT
200 DIRECTION ADJUSTMENT CONTROL UNIT
210 CENTRAL CONTROL UNIT
220 MOTOR DRIVER
230 IMAGE PROCESSING UNIT
231 IMAGE CAPTURE UNIT
232 INITIAL IMAGE RECORDING UNIT
233 IMAGE MATCHING PROCESSING UNIT
234 DISPLACEMENT CALCULATION UNIT

The invention claimed is:

1. An antenna device comprising:
an antenna unit;
a camera fixed so that a direction of the camera relative to the antenna unit does not change; and
at least one circuit configured to adjust a direction of the antenna unit, wherein
the antenna unit is set up in an initial direction so that, when the antenna unit is oriented in the initial direction, the antenna unit is oriented in a direction in which the antenna can perform wireless communication in which reception quality satisfies a predetermined level with an opposite station,
the at least one circuit is configured to return the direction of the antenna unit back to the initial direction based on an image taken by the camera, wherein
the at least one circuit is configured to automatically change the direction of the antenna unit and update the initial direction to a new initial direction based on the taken image and a radio wave strength received by the antenna unit.

2. The antenna device according to claim 1, wherein
the camera is configured to capture an arbitrary object in an imaging area when the antenna unit is oriented in the initial direction, and
the at least one circuit is configured to adjust the direction of the antenna unit based on a direction in which the object is displaced in the imaging area.

3. The antenna device according to claim 1, wherein
the at least one circuit is configured to update the initial direction by varying the direction of the antenna unit and recording the taken image and the radio wave strength.

4. A control method of an antenna device including an antenna unit mounted so that a direction of the antenna unit is adjustable, the method comprising:
setting up the antenna unit in an initial direction so that, when the antenna unit is oriented in the initial direction, the antenna unit is oriented in a direction in which the antenna can perform wireless communication in which reception quality satisfies a level with an opposite station,
returning the direction of the antenna unit back to the initial direction based on an image taken by a camera fixed so that a direction of the camera relative to the antenna unit does not change, and
automatically changing the direction of the antenna unit and updating the initial direction to a new initial direction based on the image taken by the camera and a radio wave strength received by the antenna unit.

* * * * *